(12) United States Patent
Yoon et al.

(10) Patent No.: US 10,239,461 B1
(45) Date of Patent: Mar. 26, 2019

(54) APPARATUS FOR SUPPORTING CARRIER USING ROOF BAR

(71) Applicants: Il Shik Yoon, Seoul (KR); Jun Chan Yoon, Seoul (KR)

(72) Inventors: Il Shik Yoon, Seoul (KR); Jun Chan Yoon, Seoul (KR)

(*) Notice: Subject to any disclaimer, the term of this patent is extended or adjusted under 35 U.S.C. 154(b) by 0 days.

(21) Appl. No.: 15/883,866

(22) Filed: Jan. 30, 2018

(51) Int. Cl.
*B60R 9/00* (2006.01)
*B60R 9/04* (2006.01)
*B60R 9/06* (2006.01)
*B60R 9/12* (2006.01)
*B60R 9/10* (2006.01)

(52) U.S. Cl.
CPC ............... *B60R 9/04* (2013.01); *B60R 9/06* (2013.01); *B60R 9/10* (2013.01); *B60R 9/12* (2013.01)

(58) Field of Classification Search
CPC ............ B60R 9/045; B60R 9/00; B60Q 9/042
USPC ........................................................ 224/321
See application file for complete search history.

(56) References Cited

U.S. PATENT DOCUMENTS

| | | | | |
|---|---|---|---|---|
| 3,963,136 A * | 6/1976 | Spanke | ............... | B60R 9/0423 224/310 |
| 4,948,024 A * | 8/1990 | Warner | ............... | B60R 9/042 224/310 |
| 5,752,635 A * | 5/1998 | Blankenburg | ......... | B60R 9/045 211/209 |
| 5,884,824 A * | 3/1999 | Spring, Jr. | ............... | B60R 9/042 224/309 |
| 5,951,231 A * | 9/1999 | Allen | .................... | B60P 3/1066 193/35 A |
| 6,164,507 A * | 12/2000 | Dean | ......................... | B60R 9/08 224/319 |
| 6,179,179 B1 * | 1/2001 | Potter | ..................... | B60R 9/045 224/321 |
| 6,273,668 B1 * | 8/2001 | Kameda | .............. | A61G 3/0209 224/321 |
| 6,520,393 B1 * | 2/2003 | Ferguson | .............. | B60R 9/042 224/310 |

(Continued)

*Primary Examiner* — Brian D Nash
(74) *Attorney, Agent, or Firm* — Richard John Bartz

(57) ABSTRACT

The present invention relates to an apparatus for supporting a carrier using a roof bar 10 installed on a roof of a vehicle, the apparatus including: one or more guides 20 which are installed on the roof bar 10, and each have a spool shape and a guide groove 22; multiple rings 30 which are movably installed on rods 62 of one or more carrier supports 60 of a carrier 50 installed on a trunk lid of the vehicle, in which the one or more carrier supports 60 serve to support a load and rotate in conjunction with an operation of opening and closing the trunk lid, each of the multiple rings 30 has a groove 32 which is engaged with the guide 20 on the roof bar in a state in which the trunk lid is closed, and the groove 32 is separated from the guide 20 when the trunk lid is opened; and bolts 40 which are coupled to the rings 30 by a threaded engagement and penetrate the rings 30, respectively, in which the bolts 40 are tightened to fix the rings 30 so that the rings 30 are not moved after the rings 30 are moved to adjust an interval to the roof bar 10, the rings 30 are coupled and engaged with the guides 20 when the trunk lid is closed, and the rods 62, which constitute the carrier supports 60, are moved along the guide grooves 22 of the guides 20 when the trunk lid is opened.

4 Claims, 5 Drawing Sheets

(56) References Cited

U.S. PATENT DOCUMENTS

| | | | |
|---|---|---|---|
| 7,226,266 B2 * | 6/2007 | Henderson | B60R 9/042 414/462 |
| 2005/0045678 A1 * | 3/2005 | Hurd | B60R 9/055 224/319 |
| 2008/0017679 A1 * | 1/2008 | Leblanc | B60R 9/055 224/328 |

* cited by examiner

APPARATUS FOR SUPPORTING CARRIER USING ROOF BAR

TECHNICAL FIELD

The present invention relates to an apparatus for supporting a carrier using a roof bar which is installed in a roof of a vehicle.

BACKGROUND ART

Recently, carriers for carrying bicycles, skis, snowboards, or other loads are increasingly installed on vehicles. The carrier installed on the vehicle needs to be securely fixed to the vehicle without swaying due to vibration or other impact that occurs when the vehicle travels.

In particular, a carrier installed on a trunk lid of a vehicle may be supported by a roof bar installed on a roof of the vehicle, and in this case, if the carrier is not securely fixed to the roof bar, the carrier sways or deviates from an exact position due to vibration or impact that occurs when the vehicle travels, which may cause an accident.

A distance from an end of the trunk lid to the roof bar varies in accordance with types of vehicles, but there is a problem in that there is no means for fixing the carrier appropriately to the distance variation.

SUMMARY OF THE INVENTION

The present invention has been contrived in consideration of the problem in the related art, an object of the present invention is to provide a carrier support apparatus capable of securely fixing a carrier to a roof bar of a vehicle and fixing the carrier appropriately to an interval to the roof bar regardless of the type of vehicle.

To achieve the object, the present invention provides an apparatus for supporting a carrier using a roof bar 10 installed on a roof of a vehicle, the apparatus including: one or more guides 20 which are installed on the roof bar 10, and each have a spool shape and a guide groove 22; multiple rings 30 which are movably installed on rods 62 of one or more carrier supports 60 of a carrier 50 installed on a trunk lid of the vehicle, in which the one or more carrier supports 60 serve to support a load and rotate in conjunction with an operation of opening and closing the trunk lid, each of the multiple rings 30 has a groove 32 which is engaged with the guide 20 on the roof bar in a state in which the trunk lid is closed, and the groove 32 is separated from the guide 20 when the trunk lid is opened; and bolts 40 which are coupled to the rings 30 by a threaded engagement and penetrate the rings 30, respectively, in which the bolts 40 are tightened to fix the rings 30 so that the rings 30 are not moved after the rings 30 are moved to adjust an interval to the roof bar 10, the rings 30 are coupled and engaged with the guides 20 when the trunk lid is closed, and the rods 62, which constitute the carrier supports 60, are moved along the guide grooves 22 of the guides 20 when the trunk lid is opened.

The guide 20 may be rotatably installed on the roof bar 10.

As necessary, a rotating wheel 36 may be installed at a lower end of the ring 30, and the rotating wheel 36 may roll along the roof of the vehicle when the trunk lid is opened.

According to the present invention configured as described above, it is possible to more securely and safely fix the carrier against vibration or external impact that occurs when the vehicle travels, and it is possible to stabilize motion of the carrier.

DETAILED DESCRIPTION

Figure 1:
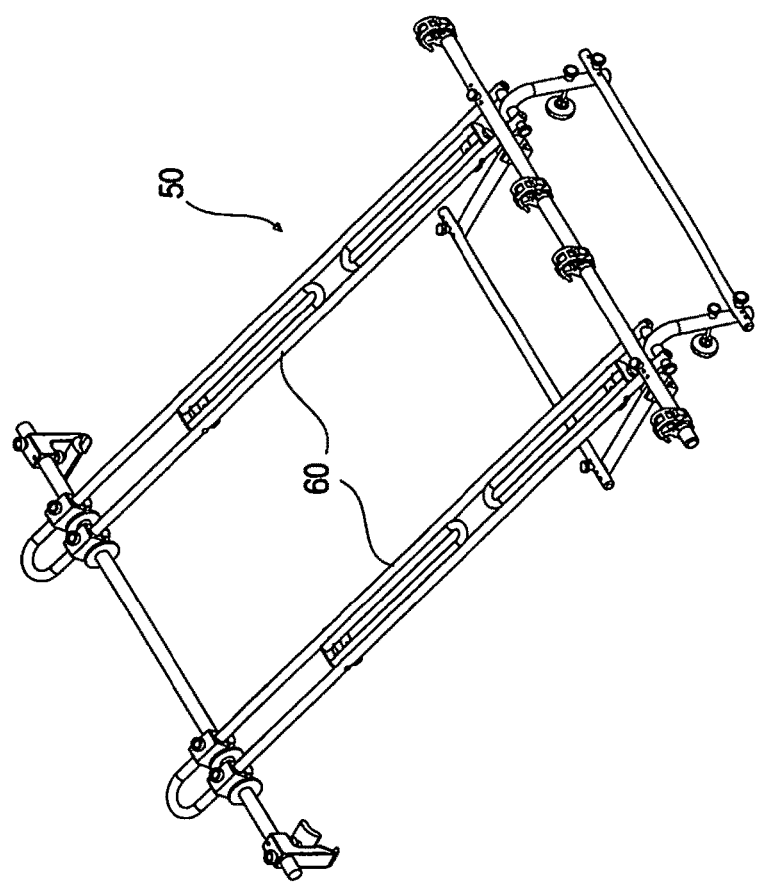
FIG. 1 is a perspective view of a first exemplary embodiment of the present invention.
Figure 1A:
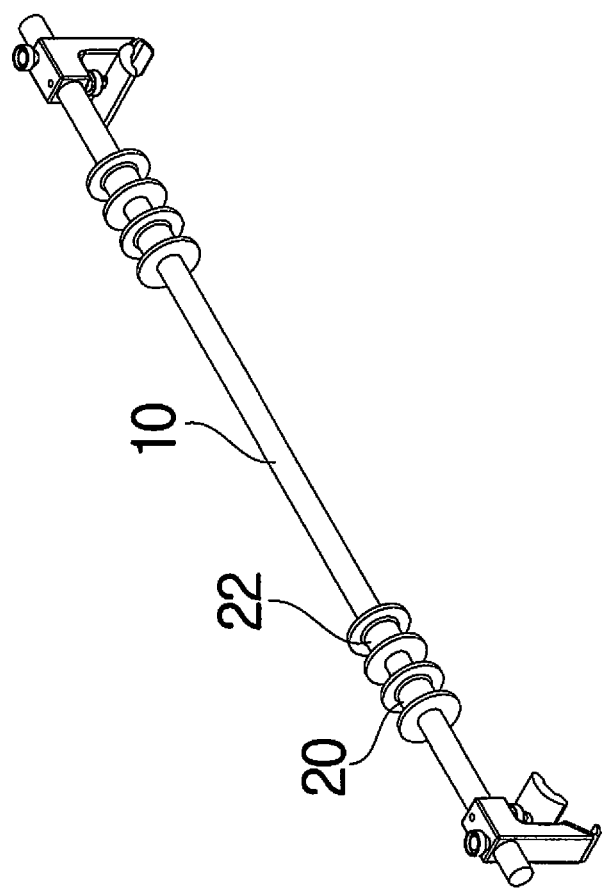
FIG. 1A is a perspective view of a roof bar in FIG. 1.

FIG. 1 is a perspective view and a partially enlarged view of a first exemplary embodiment of the present invention, and FIG. 1A is a perspective view of a roof bar.

As illustrated, an apparatus for supporting a carrier using a roof bar of the present invention uses a roof bar 10 illustrated in FIGS. 1 and 1A. The roof bar 10 is generally installed on a roof of a vehicle, particularly, to traverse a rear portion of a roof. Multiple guides 20 having a spool shape or a pulley shape having a groove are installed on the roof bar 10, and each of the guides 20 has a guide groove 22. The number of guides 20 may be one or more and may correspond to the number of rods 62 of a carrier support 60 to be described below. The guide 20 may be securely fixed to the roof bar 10 or may be rotatably installed, as necessary.

As illustrated in FIG. 1, a carrier 50 used in the present invention may support a general load as well as a bicycle, skis, or a snowboard, and the carrier 50 is installed on a trunk lid of the vehicle. A carrier support 60 of the carrier 50, which serves to support the load, is rotated in conjunction with an operation of opening and closing the trunk lid (see FIG. 2). The number of carrier supports 60 of the carrier 50 may be generally one or two, but may be more than two, as necessary.

Multiple rings 30 are installed in the vicinity of an end portion of the carrier support 60, and a groove 32 opened at a rear side thereof is formed in each of the rings 30, such that the groove 32 is coupled and engaged with the guide 20 on the roof bar in a state in which the trunk lid is closed. Of course, when the trunk lid is opened, the groove 32 is separated from the guide 20. In addition, a distance from an end of the trunk lid to the roof bar varies in accordance with whether the vehicle is an SUV, a passenger vehicle, a midsize vehicle, or a small-sized vehicle. To cope with the distance difference, the rings 30 are movably installed on the rod 62 of the carrier support 60, and after an interval between the rings 30 is adjusted in accordance with types of vehicles, the rings 30 need not be moved. To this end, a bolt 40 is installed on an upper portion of each of the rings 30, and the bolt 40 is coupled to the ring 30 by a threaded engagement and penetrates the ring 30. When the bolt 40 is further tightened, an end portion of the bolt is engaged with the rod 62 of the carrier support 60, such that the ring is securely fixed to the carrier support.

Figure 2:
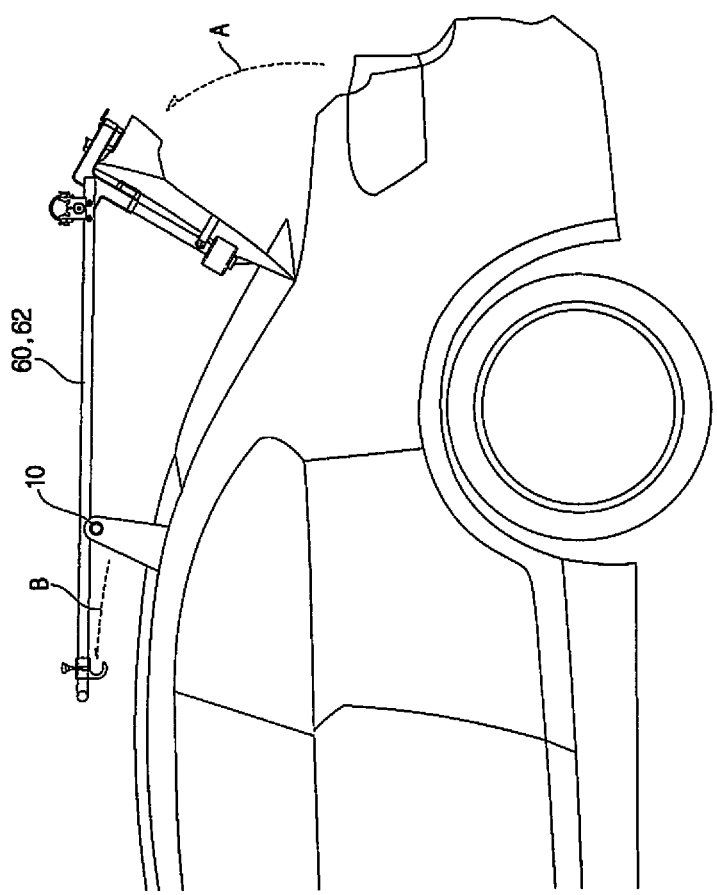
FIG. 2 is a side view illustrating a state in which a trunk lid is opened.

FIG. 1 illustrates a state in which the trunk lid is closed and the carrier support 60 is coupled to the roof bar, while FIG. 2 is a side view illustrating a state in which the trunk lid is opened.

As illustrated in FIG. 2, when the trunk lid is opened in a direction indicated by the arrow A in a state in which the ring 30 is fixed, the rod 62, which constitutes the carrier support 60, is moved in a direction indicated by the arrow B along the roof bar 10, specifically, along the guide groove 22 of the guide 20 installed on the roof bar. Since the carrier support is moved along the guide 20, the operation of the carrier is further stabilized.

Figure 3:
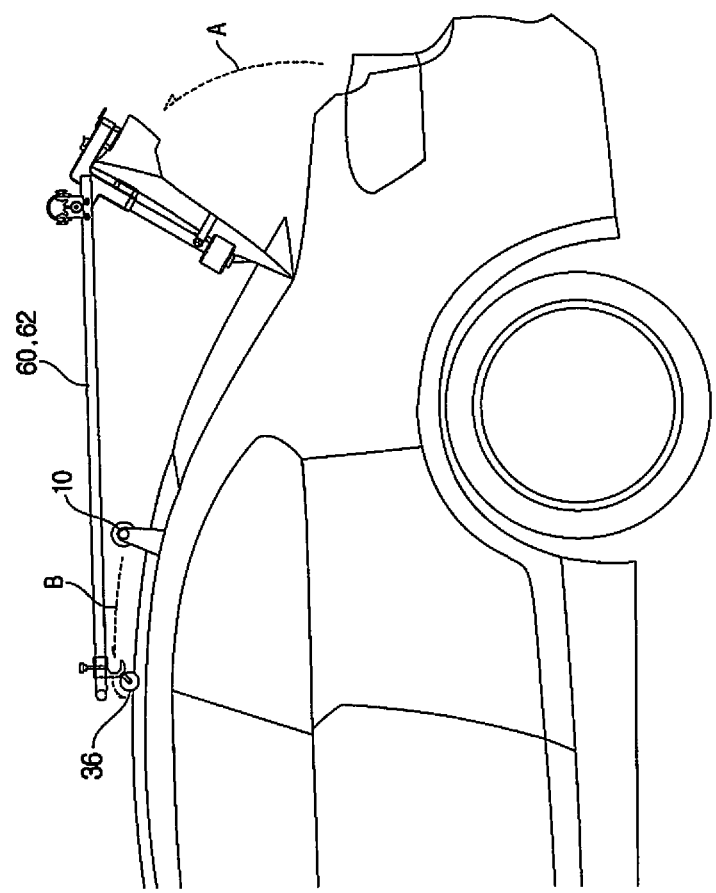
FIG. 3 is a side view of a second exemplary embodiment of the present invention.
Figure 4:
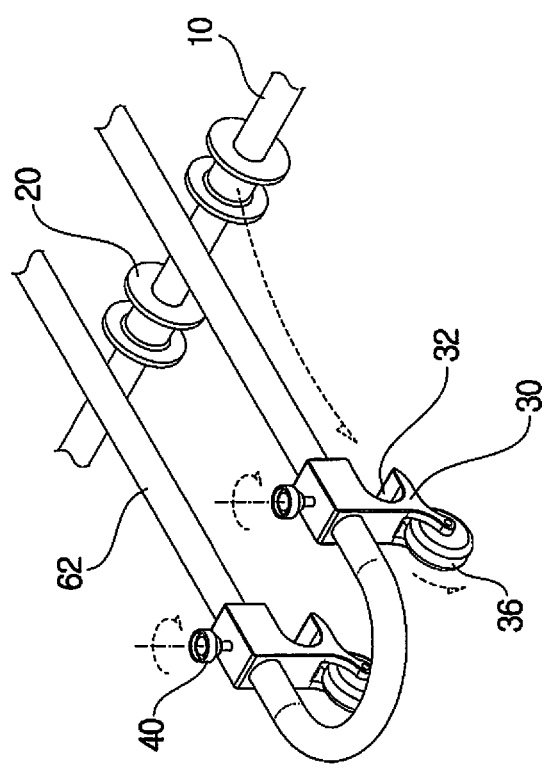
FIG. 4 is a perspective view of the second exemplary embodiment of the present invention.

FIGS. 3 and 4 illustrate a second exemplary embodiment of the present invention. This exemplary embodiment provides an example in which an interval between the roof bar 10 and the roof of the vehicle is small. As illustrated in FIG. 3, when the trunk lid is opened in this state, the rod 62 of the carrier support may be moved in a state in which an end portion of the rod 62 of the carrier support is in contact with the roof of the vehicle, which causes damage to the roof of the vehicle. To prevent the situation, when a rotating wheel 36 is installed at a lower end of each of the rings 30, the rotating wheel 36 rolls along the roof of the vehicle when the trunk lid is opened, and as a result, it is possible to prevent damage to the roof of the vehicle. This configuration is illustrated in more detail in FIG. 4.

What is claimed is:

1. An apparatus for supporting a carrier in combination with a roof bar 10 installed on a roof of a vehicle, the apparatus comprising:
    one or more guides 20 which are installed on a roof bar 10, and each have a spool shape and a guide groove 22;
    multiple rings 30 which are movably installed on rods 62 of one or more carrier supports 60 of a carrier 50 installed on a trunk lid of a vehicle, wherein the one or more carrier supports 60 serve to support a load, each of the multiple rings 30 has a groove 32 which is engaged with the guide 20 on the roof bar in a state in which the trunk lid is closed, and the groove 32 is separated from the guide 20 when the trunk lid is opened; and
    bolts 40 which are coupled to the rings 30 by a threaded engagement and penetrate the rings 30, respectively,
    wherein the bolts 40 are tightened to fix the rings 30 so that the rings 30 are not moved after the rings 30 are moved to adjust an interval to the roof bar 10, the rings 30 are coupled and engaged with the guides 20 when the trunk lid is closed, and the rods 62, which constitute the carrier supports 60, are moved along the guide grooves 22 of the guides 20 when the trunk lid is opened.

2. The apparatus of claim 1, wherein the guide 20 is rotatably installed on the roof bar 10.

3. The apparatus of claim 2, wherein a rotating wheel 36 is installed at a lower end of the ring 30, and the rod 62 is separated from the guide 20 and the rotating wheel 36 rolls along the roof of the vehicle when the trunk lid is further opened.

4. The apparatus of claim 1, wherein a rotating wheel 36 is installed at a lower end of the ring 30, and the rod 62 is separated from the guide 20 and the rotating wheel 36 rolls along the roof of the vehicle when the trunk lid is further opened.

* * * * *